United States Patent

Saga

(10) Patent No.: US 9,875,199 B2
(45) Date of Patent: Jan. 23, 2018

(54) DATA TRANSFER CONTROL APPARATUS

(71) Applicant: Yoshitaka Saga, Kanagawa (JP)

(72) Inventor: Yoshitaka Saga, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 203 days.

(21) Appl. No.: 14/823,613

(22) Filed: Aug. 11, 2015

(65) Prior Publication Data

US 2016/0062927 A1 Mar. 3, 2016

(30) Foreign Application Priority Data

Aug. 26, 2014 (JP) ................................. 2014-172064

(51) Int. Cl.
G06F 13/28 (2006.01)
G06F 13/16 (2006.01)

(52) U.S. Cl.
CPC .......... *G06F 13/28* (2013.01); *G06F 13/1673* (2013.01)

(58) Field of Classification Search
CPC .............................. G06F 13/28; G06F 13/1673
See application file for complete search history.

(56) References Cited

U.S. PATENT DOCUMENTS 6,145,032 A * 11/2000 Bannister ............... H04L 49/90
370/414
9,092,362 B1 * 7/2015 Alcantara ........... G06F 12/0246
2003/0221027 A1 * 11/2003 Chang ..................... G06F 13/28
710/22
2008/0294806 A1 * 11/2008 Swindle .................. G06F 13/28
710/22
2010/0115172 A1 * 5/2010 Gillingham .......... G06F 13/4059
710/310
2014/0215103 A1 * 7/2014 Cohen ..................... G06F 13/28
710/23
2015/0134880 A1 * 5/2015 Danilak .............. G06F 12/0246
711/103
2017/0019538 A1 * 1/2017 Horsley ............... H04M 11/062

FOREIGN PATENT DOCUMENTS

JP 2003-337805 11/2003

* cited by examiner

Primary Examiner — Farley Abad
(74) Attorney, Agent, or Firm — Harness, Dickey & Pierce, P.L.C.

(57) ABSTRACT

A data transfer control apparatus controls data transfers between different modules, and includes a module DMA controller configured for a predetermined module, a function DMA controller that provides a function absent in the module DMA controller, and a temporary memory coupled to the module DMA controller and the function DMA controller. When the temporary memory is input with data acquired by the module DMA controller from the predetermined module in order of acquisition, the temporary memory outputs the acquired data to the function DMA controller in order of input. When the temporary memory is input with data to be transferred to the predetermined module from the function DMA controller, the temporary memory outputs the data to be transferred to the module DMA controller in order of input.

12 Claims, 12 Drawing Sheets

FIG. 3

| 0 | 1 | ... | X1 | X1+1 | ... | X2−1 | X2 | ... | n−2 | n−1 |
|---|---|---|---|---|---|---|---|---|---|---|
| n | n+1 | ... | n+X1 | n+X1+1 | ... | n+X2−1 | n+X2 | ... | 2n−2 | 2n−1 |
| 2n | 2n+1 | ... | 2n+X1 | 2n+X1+1 | ... | 2n+X2−1 | 2n+X2 | ... | 3n−2 | 3n−1 |
| 3n | 3n+1 | ... | 3n+X1 | 3n+X1+1 | ... | 3n+X2−1 | 3n+X2 | ... | 4n−2 | 4n−1 |
| ... | ... | ... | ... | ... | ... | ... | ... | ... | ... | ... |
| Y1*n | Y1*n+1 | ... | Y1*n+X1 | Y1*n+X1+1 | ... | Y1*n+X2−1 | Y1*n+X2 | ... | (Y1+1)*n−2 | (Y1+1)*n−1 |
| (Y1+1)*n | (Y1+1)*n+1 | ... | (Y1+1)*n+X1 | (Y1+1)*n+X1+1 | ... | (Y1+1)*n+X2−1 | (Y1+1)*n+X2 | ... | (Y1+2)*n−2 | (Y1+2)*n−1 |
| ... | ... | ... | ... | ... | ... | ... | ... | ... | ... | ... |
| (Y2−1)*n | (Y2−1)*n+1 | ... | (Y2−1)*n+X1 | (Y2−1)*n+X1+1 | ... | (Y2−1)*n+X2−1 | (Y2−1)*n+X2 | ... | Y2*n−2 | Y2*n−1 |
| Y2*n | Y2*n+1 | ... | Y2*n+X1 | Y2*n+X1+1 | ... | Y2*n+X2−1 | Y2*n+X2 | ... | (Y2+1)*n−2 | (Y2+1)*n−1 |
| ... | ... | ... | ... | ... | ... | ... | ... | ... | ... | ... |
| (m−2)*n | (m−2)*n+1 | ... | (m−2)*n+X1 | (m−2)*n+X1+1 | ... | (m−2)*n+X2−1 | (m−2)*n+X2 | ... | (m−1)*n−2 | (m−1)*n−1 |
| (m−1)*n | (m−1)*n+1 | ... | (m−1)+X1 | (m−1)*n+X1+1 | ... | (m−1)+X2−1 | (m−1)+X2 | ... | m*n−2 | m*n−1 |

| Address | Field |
|---|---|
| 0x8000_1024 | VERTICAL IMAGE SIZE (m) — 429 |
| 0x8000_1020 | HORIZONTAL IMAGE SIZE (n) — 428 |
| 0x8000_101C | VERTICAL IMAGE CLIPPING END OFFSET ADDRESS (Y2) — 427 |
| 0x8000_1018 | HORIZONTAL IMAGE CLIPPING END OFFSET ADDRESS (X2) — 426 |
| 0x8000_1014 | VERTICAL IMAGE CLIPPING START OFFSET ADDRESS (Y1) — 425 |
| 0x8000_1010 | HORIZONTAL IMAGE CLIPPING START OFFSET ADDRESS (X1) — 424 |
| 0x8000_100C | DATA TRANSFER DESTINATION ADDRESS (FIFO INPUT: 0x0020_0000) — 423 |
| 0x8000_1008 | DATA TRANSFER SOURCE ADDRESS (0xC000_0000) — 422 |
| 0x8000_1004 | NEXT DESCRIPTOR ADDRESS (0x8000_1040) — 421 |
| 0x8000_1000 | TRANSFER MODE (MEMORY→FIFO) — 4201 |

430

| Address | Field |
|---|---|
| 0x8000_1064 | VERTICAL IMAGE SIZE (m) — 439 |
| 0x8000_1060 | HORIZONTAL IMAGE SIZE (n) — 438 |
| 0x8000_105C | VERTICAL IMAGE CLIPPING END OFFSET ADDRESS (Y4) — 437 |
| 0x8000_1058 | HORIZONTAL IMAGE CLIPPING END OFFSET ADDRESS (X4) — 436 |
| 0x8000_1054 | VERTICAL IMAGE CLIPPING START OFFSET ADDRESS (Y3) — 435 |
| 0x8000_1050 | HORIZONTAL IMAGE CLIPPING START OFFSET ADDRESS (X3) — 434 |
| 0x8000_104C | DATA TRANSFER DESTINATION ADDRESS (FIFO INPUT: 0x0020_0000) — 433 |
| 0x8000_1048 | DATA TRANSFER SOURCE ADDRESS (0xC000_0000) — 432 |
| 0x8000_1044 | NEXT DESCRIPTOR ADDRESS (0x0000_0000) — 431 |
| 0x8000_1040 | TRANSFER MODE (MEMORY→FIFO) — 4301 |

FIG. 5

| Address | 420 Descriptor | | Address | 430 Descriptor |
|---|---|---|---|---|
| 0x8000_1024 | VERTICAL IMAGE SIZE (m) — 429 | | 0x8000_1064 | VERTICAL IMAGE SIZE (m) — 439 |
| 0x8000_1020 | HORIZONTAL IMAGE SIZE (n) — 428 | | 0x8000_1060 | HORIZONTAL IMAGE SIZE (n) — 438 |
| 0x8000_101C | VERTICAL IMAGE CLIPPING END OFFSET ADDRESS (Y2) — 427 | | 0x8000_105C | VERTICAL IMAGE CLIPPING END OFFSET ADDRESS (Y4) — 437 |
| 0x8000_1018 | HORIZONTAL IMAGE CLIPPING END OFFSET ADDRESS (X2) — 426 | | 0x8000_1058 | HORIZONTAL IMAGE CLIPPING END OFFSET ADDRESS (X4) — 436 |
| 0x8000_1014 | VERTICAL IMAGE CLIPPING START OFFSET ADDRESS (Y1) — 425 | | 0x8000_1054 | VERTICAL IMAGE CLIPPING START OFFSET ADDRESS (Y3) — 435 |
| 0x8000_1010 | HORIZONTAL IMAGE CLIPPING START OFFSET ADDRESS (X1) — 424 | | 0x8000_1050 | HORIZONTAL IMAGE CLIPPING START OFFSET ADDRESS (X3) — 434 |
| 0x8000_100C | DATA TRANSFER DESTINATION ADDRESS (0xC000_0000) — 423 | | 0x8000_104C | DATA TRANSFER DESTINATION ADDRESS (0xC000_0000) — 433 |
| 0x8000_1008 | DATA TRANSFER SOURCE ADDRESS (FIFO OUTPUT: 0x0020_1000) — 422 | | 0x8000_1048 | DATA TRANSFER SOURCE ADDRESS (FIFO OUTPUT: 0x0020_1000) — 432 |
| 0x8000_1004 | NEXT DESCRIPTOR ADDRESS (0x8000_1040) — 421 | | 0x8000_1044 | NEXT DESCRIPTOR ADDRESS (0x0000_0000) — 431 |
| 0x8000_1000 | TRANSFER MODE (FIFO→MEMORY) — 4201 | | 0x8000_1040 | TRANSFER MODE (FIFO→MEMORY) — 4301 |

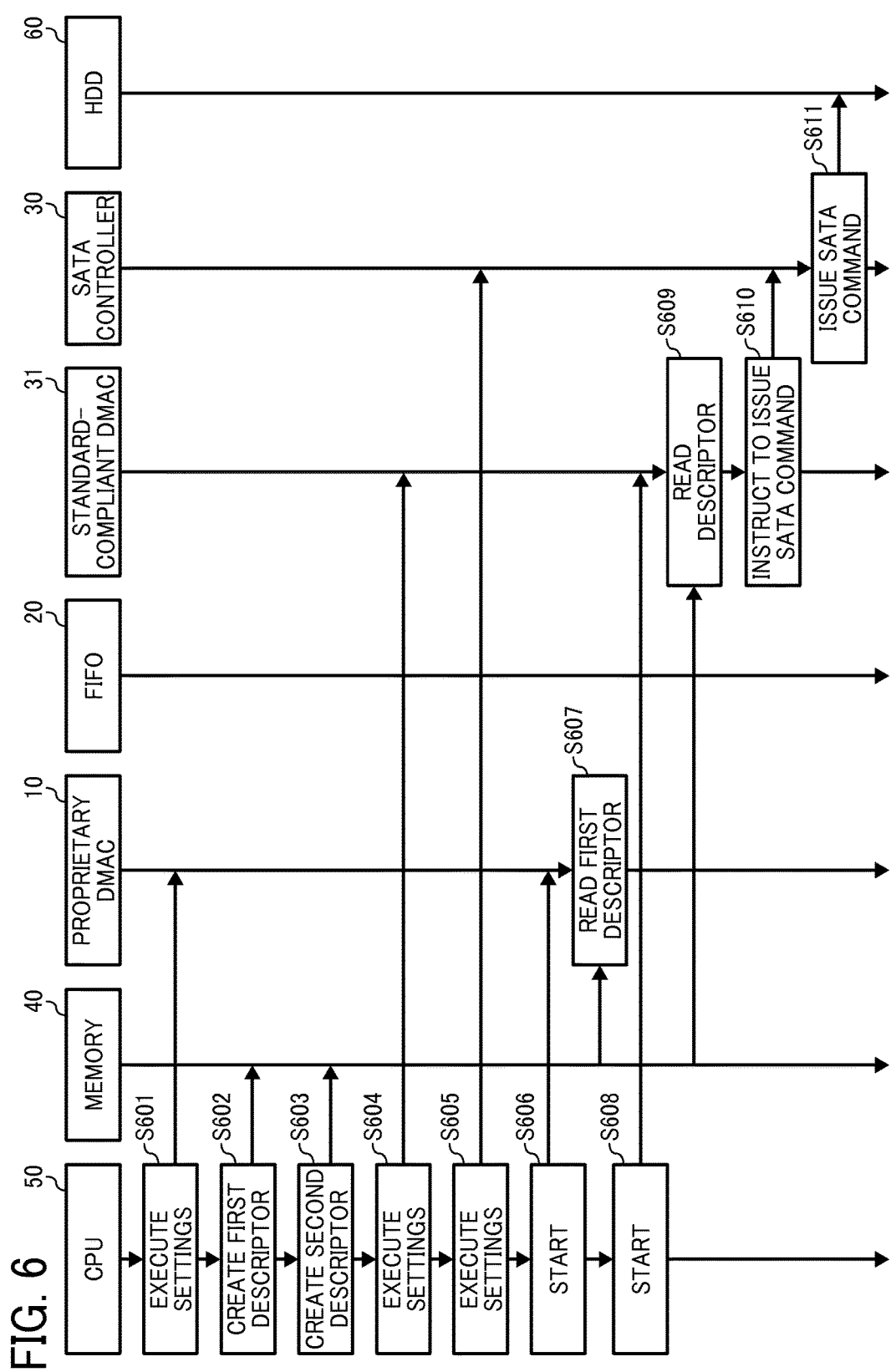

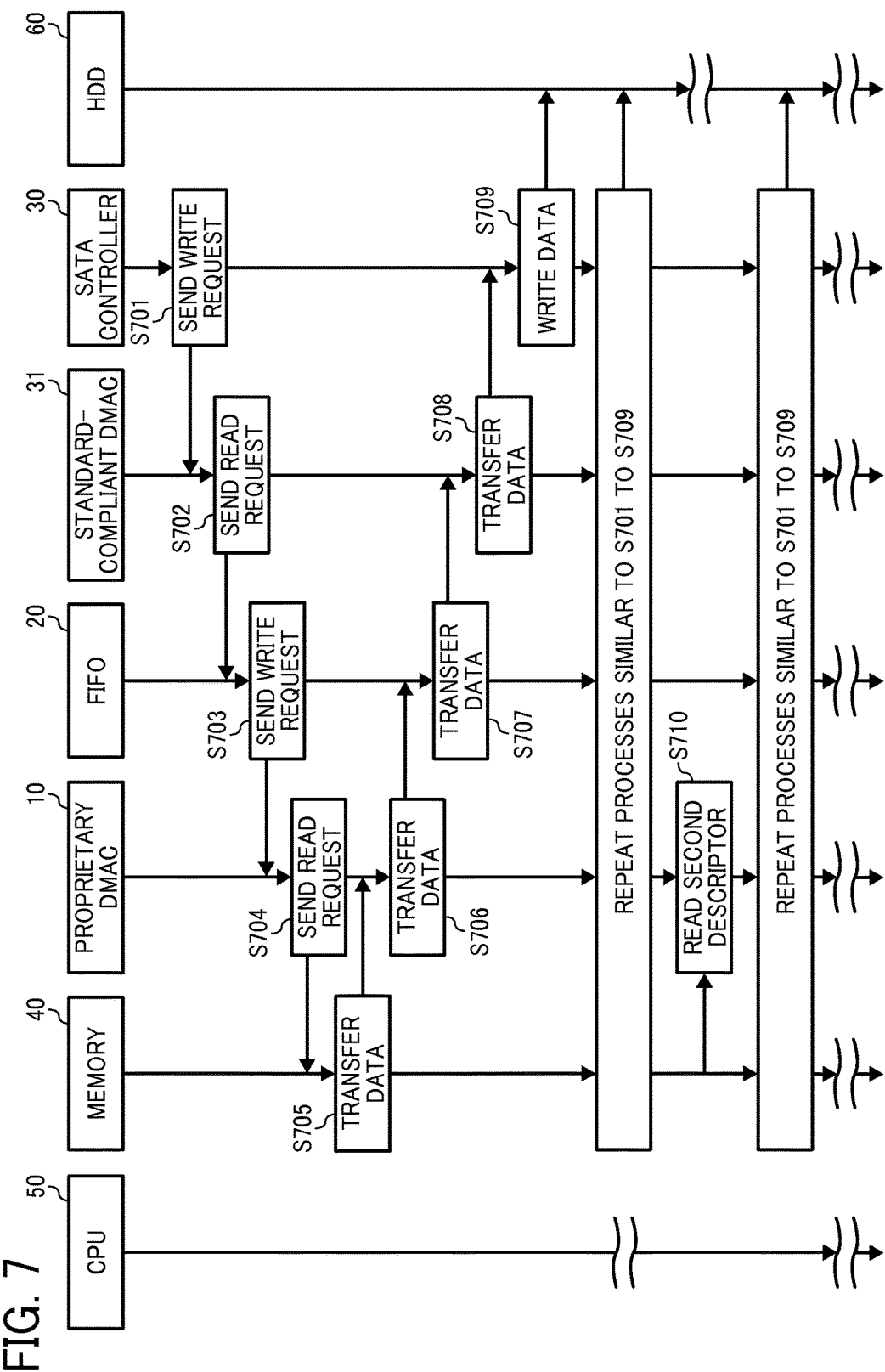

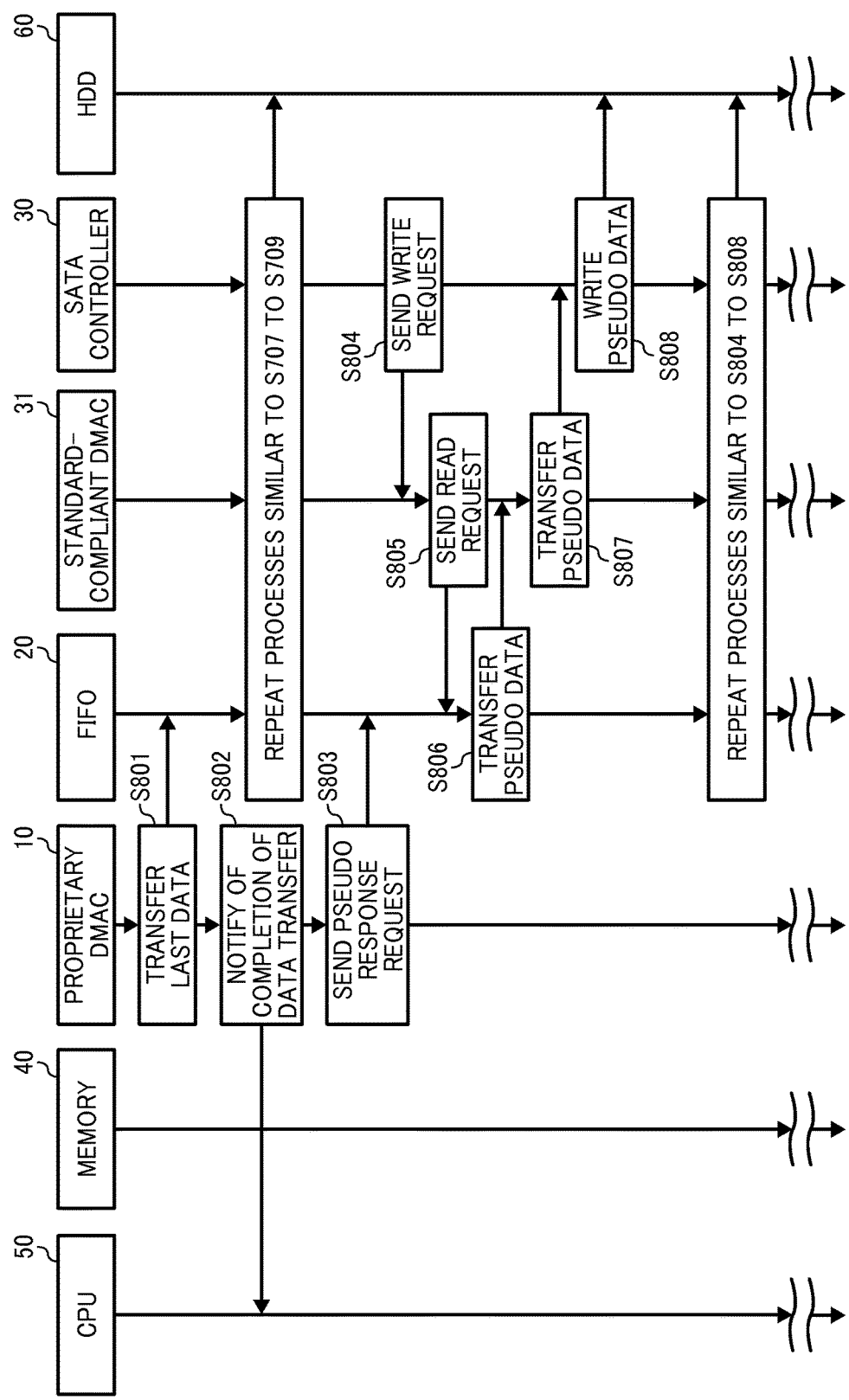

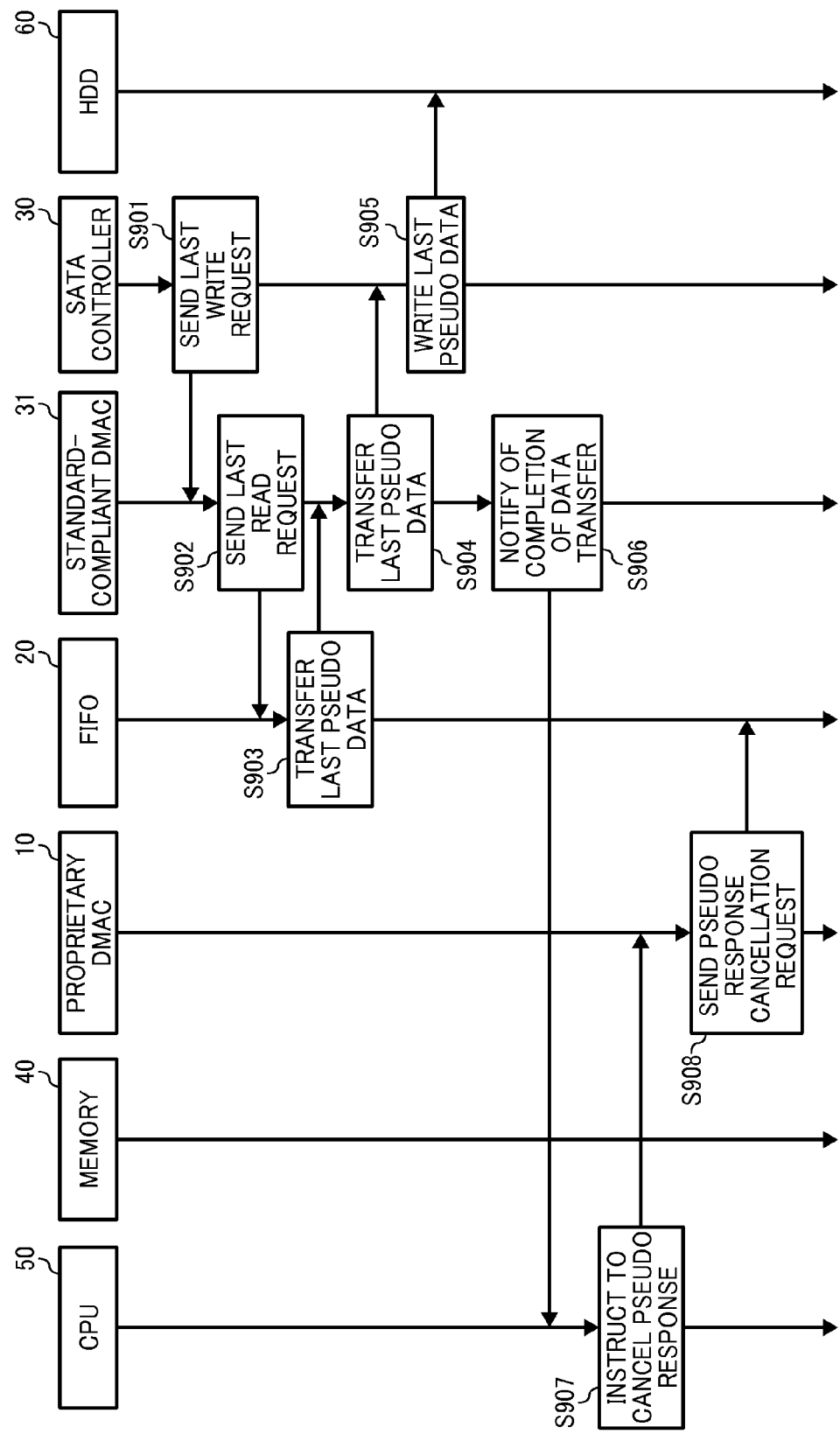

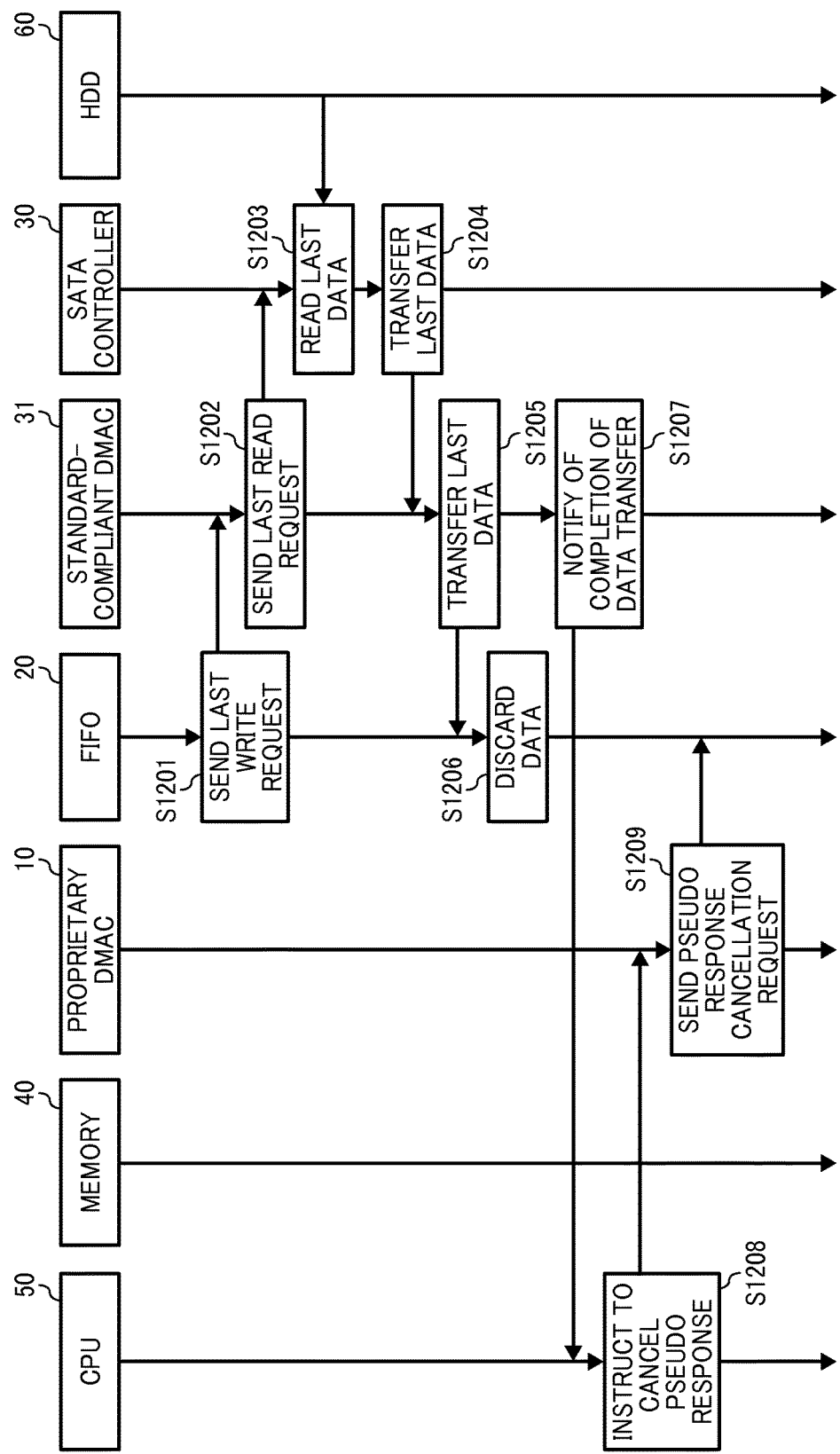

//DATA TRANSFER CONTROL APPARATUS

CROSS-REFERENCE TO RELATED APPLICATION

This patent application is based on and claims priority pursuant to 35 U.S.C. §119(a) to Japanese Patent Application No. 2014-172064 on Aug. 26, 2014, in the Japan Patent Office, the entire disclosure of which is hereby incorporated by reference herein.

BACKGROUND

Technical Field

This disclosure relates to a data transfer control apparatus.

Related Art

To increase the speed of data communication or data processing between an information processing apparatus, such as a personal computer (PC) or an image forming apparatus, and a peripheral input/output (I/O) device connected to the information processing apparatus, a configuration that exchanges data via a first-in, first-out (FIFO) unit connected to a bus has been proposed in recent years. Further, to directly transfer data between a peripheral I/O device and a memory or between peripheral I/O devices without a central processing unit (CPU), a configuration including a master direct memory access controller (DMA controller or DMAC) for each functional module has also been proposed.

The peripheral I/O devices include, for example, a hard disc drive (HDD), a solid state drive (SSD), a universal serial bus (USB) memory, a secure digital (SD) memory card, and an expansion card connected to a peripheral component interconnect express (PCIe) interface. The data processing includes, for example, image processing, data compression, data decompression, data coding, and data decoding.

SUMMARY

In one embodiment of this disclosure, there is provided an improved data transfer control apparatus that controls data transfers between different modules and includes, for example, a module DMA controller configured for a predetermined module, a function DMA controller that provides a function absent in the module DMA controller, and a temporary memory coupled to the module DMA controller and the function DMA controller. When the temporary memory is input with data acquired by the module DMA controller from the predetermined module in order of acquisition, the temporary memory outputs the acquired data to the function DMA controller in order of input. When the temporary memory is input with data to be transferred to the predetermined module from the function DMA controller, the temporary memory outputs the data to be transferred to the module DMA controller in order of input.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a diagram illustrating the relationship between memory addresses and pixel information of two-dimensional image data stored in an image storage area of the memory according to the embodiment;

FIG. 4 is a diagram illustrating descriptor settings in image data reading from the memory through two-dimensional DMA transfer by a proprietary DMAC of the information processing apparatus according to the embodiment;

FIG. 5 is a diagram illustrating descriptor settings in image data writing to the memory through two-dimensional DMA transfer by the proprietary DMAC of the information processing apparatus according to the embodiment;

FIG. 6 is a sequence diagram illustrating a preparatory process preceding data transfer performed by the proprietary DMAC and a standard-compliant DMAC via a FIFO in the information processing apparatus according to the embodiment;

FIGS. 7 to 9 are sequence diagrams illustrating a process of reading image data from the memory and writing the image data to an HDD performed by the proprietary DMAC and the standard-compliant DMAC via the FIFO in the information processing apparatus according to the embodiment; and FIGS. 10 to 12 are sequence diagrams illustrating a process of reading image data from the HDD and writing the image data to the memory performed by the proprietary DMAC and the standard-compliant DMAC via the FIFO in the information processing apparatus according to the embodiment.

Figure 1:
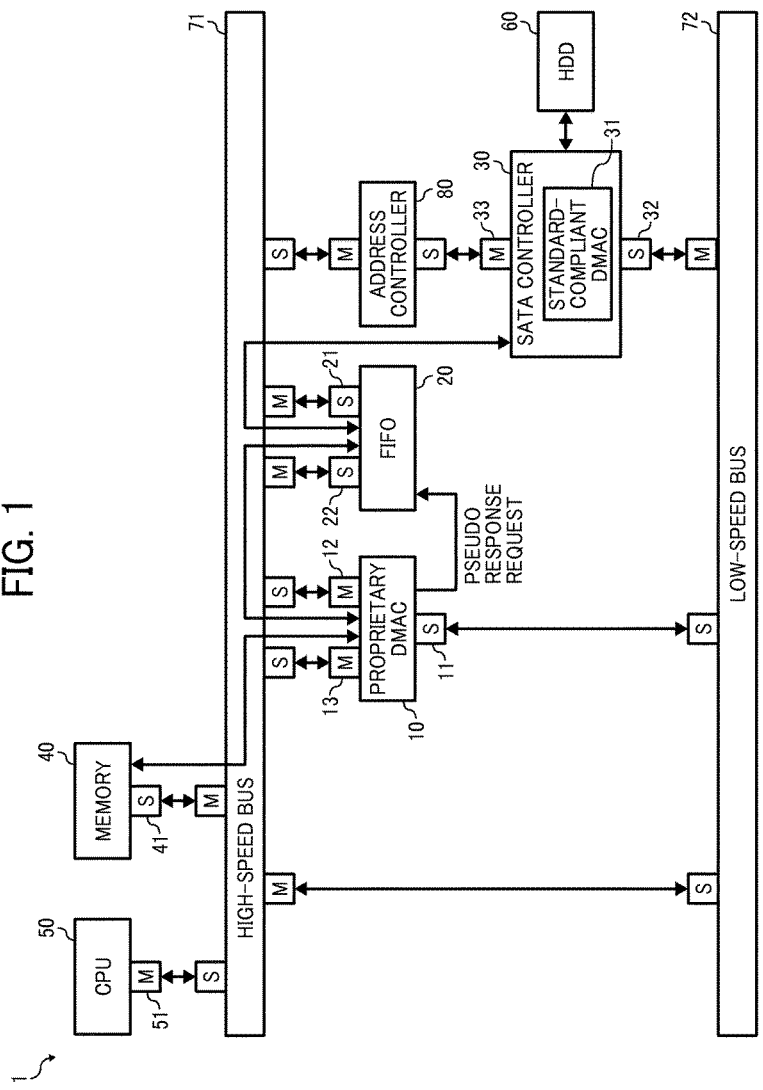
FIG. 1 is a schematic block diagram illustrating a hardware configuration of an information processing apparatus according to an embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, an embodiment of this disclosure will be described in detail. In an example described below, a data transfer control apparatus according to the embodiment is an information processing apparatus, such as a personal computer (PC) or an image forming apparatus, in which a proprietary direct memory access controller (DMAC) having specifications not specified by a standard and a standard-compliant DMAC having specifications specified by a standard transfer data between a memory and a hard disc drive (HDD) via a first-in, first-out (FIFO) unit.

A typical DMAC is used embedded in a module. To use a proprietary function absent in such an embedded DMAC, the embedded DMAC and a proprietary DMAC having the proprietary function are used in combination. Since the embedded DMAC and the proprietary DMAC both operate as masters, a memory serving as a slave is used for data transfer therebetween in this case. The data transfer is controlled such that all data to be transferred is first transferred (i.e., written) to the memory by one of the DMACs and then read from the memory in order of transfer by the other DMAC. However, such control is inefficient, increasing accesses to the memory and the memory usage. This issue is also applicable to a DMAC configured for a predetermined module as well as to the DMAC embedded in a module.

In the present embodiment, the proprietary DMAC and the standard-compliant DMAC have different functions; the proprietary DMAC has functions absent in the standard-compliant DMAC, such as a two-dimensional DMA transfer function and a descriptor chaining function. That is, the standard-compliant DMAC and the proprietary DMAC function as a module DMAC and a function DMAC, respectively, in the embodiment. With this configuration, the information processing apparatus according to the embodiment performs efficient control in combined use of the standard-compliant DMAC and the proprietary DMAC.

A hardware configuration of an information processing apparatus 1 according to the embodiment will now be described with reference to FIG. 1. FIG. 1 is a schematic block diagram illustrating a hardware configuration of the information processing apparatus 1 according to the embodiment.

As illustrated in FIG. 1, the information processing apparatus 1 according to the embodiment includes a proprietary DMAC 10, a FIFO 20, a serial advanced technology attachment (SATA) controller 30 including a standard-compliant DMAC 31, a memory 40, a central processing unit (CPU) 50, an HDD 60, a high-speed bus 71, a low-speed bus 72, and an address controller 80.

The FIFO 20 is a temporary memory from which data is extracted in order of input. The FIFO 20 is connected to the high-speed bus 71 via two slave interfaces for data input and output, i.e., a slave interface 21 for data transmission and a slave interface 22 for data reception. A module having a master interface connected to the high-speed bus 71 is capable of accessing the FIFO 20.

If the FIFO 20 detects the assertion of a pseudo response request as a control signal output by the proprietary DMAC 10, the FIFO 20 starts a pseudo response. If a data transmission request is received from a master interface during the pseudo response, the FIFO 20 transmits pseudo data irrespective of the state in the FIFO 20, i.e., even if there is no data in the FIFO 20. Further, if a data reception request is received from a master interface during the pseudo response, the FIFO 20 receives data irrespective of the state in the FIFO 20, i.e., even if the FIFO 20 is already filled with data, and discards the received data without storing the data.

A description will now be given of the reason for the FIFO 20 according to the embodiment thus transmitting the pseudo data in response to the data transmission request received from the master interface during the pseudo response even if there is not data in the FIFO 20 and receiving the data in response to the data reception request received from the master interface during the pseudo response even if the FIFO 20 is already filled with data.

Since a memory such as the HDD 60 is accessed in sectors, the data transfer size of the standard-compliant DMAC 31 is equal to an integral multiple of the sector size. In contrast, the data transfer size of the proprietary DMAC 10 is settable in pixels. Accordingly, a difference in data transfer amount arises between the standard-compliant DMAC 31 and the proprietary DMAC 10. Even if there is such a difference in data transfer amount therebetween, the information processing apparatus 1 according to the embodiment is capable of normally completing the data transfer by performing the above-described pseudo response.

In other words, if the FIFO 20 is configured not to perform the pseudo response, the information processing apparatus 1 has to wait for data input to the FIFO 20 to respond to the data transmission request to the FIFO 20, and wait until space is available in the FIFO 20 to respond to the data reception request to the FIFO 20. The information processing apparatus 1 according to the embodiment, therefore, performs the above-described pseudo response to normally complete the data transfer.

The slave interface 21 for data transmission transmits data stored in the FIFO 20 to a master interface having a reception function. A module including the master interface having the reception function performs a read operation from the address allocated to the slave interface 21 for data transmission, to thereby acquire the data stored in the FIFO 20.

The slave interface 22 for data reception receives data transmitted from a master interface having a transmission function. The received data is stored in the FIFO 20. A module including the master interface having the transmission function performs a write operation to the address allocated to the slave interface 22 for data reception, to thereby input the data to the FIFO 20.

The slave interfaces 21 and 22 are connected to the high-speed bus 71 with a data bus width of 128 bits. The storage capacity of the FIFO 20 corresponds to two 8-burst operations, i.e., 8×128 bits×2=2048 bits=256 bytes. Herein, the transfer size of the 8-burst operation (i.e., 8×128 bits) corresponds to the transfer size of each burst transfer by the standard-compliant DMAC 31 of the SATA controller 30, which frequently uses the FIFO 20. With this configuration, the FIFO 20 is capable of maintaining the data transfer speed thereof with the minimum storage capacity when the speed of writing data to the FIFO 20 is equal to the speed of reading data from the FIFO 20.

The high-speed bus 71 mediates the data transfer between a module having a master interface (i.e., master module) and a module having a slave interface (i.e., slave module). The data transfer between the master module and the slave module may take place in parallel in multiple pairs of master and slave modules connected to the high-speed bus 71. The high-speed bus 71 according to the embodiment has a bandwidth of a few gigabytes per second.

The low-speed bus 72 is used to transmit and receive data that is not required to be transferred at high speed, such as settings information of functional modules, and mediates the data transfer between a module having a master interface and a module having a slave interface. During the data transfer between a pair of master and slave modules connected to the low-speed bus 72, the data transfer between another pair of master and slave modules connected to the low-speed bus 72 is not allowed. The low-speed bus 72 according to the embodiment has a bandwidth of tens of megabytes per second.

The CPU 50 sets the operations of the functional modules, and performs overall control of the information processing apparatus 1. Via a master interface 51 for data transmission and reception, the CPU 50 is capable of accessing a module having a slave interface connected to the high-speed bus 71. Each slave interface is allocated with a specific address value or an address range according to the specifications of the slave module. The CPU 50 is capable of accessing a desired slave module by specifying the address value or the address range.

The proprietary DMAC 10 is a DMAC independently designed and developed or independently procured and having specifications not specified by a standard. The proprietary DMAC 10 is connected to the high-speed bus 71 via a master interface 12 for data transmission (i.e., data input) and a master interface 13 for data reception (i.e., data output), and is capable of accessing a module having a slave interface connected to the high-speed bus 71.

The proprietary DMAC 10 is capable of writing data to a module having a slave interface for data reception via the master interface 12 for data transmission, and reading data from a module having a slave interface for data transmission via the master interface 13 for data reception.

Further, the proprietary DMAC 10 has the two-dimensional DMA transfer function. When two-dimensional image data stored as a two-dimensional image is transferred between the memory 40 and the HDD 60, therefore, the proprietary DMAC 10 is capable of transferring not all of the image data but only a specific rectangular area selected from the image data. Details of the two-dimensional DMA transfer function will be described later with reference to FIGS. 3 to 5.

After the completion of the data transfer, the proprietary DMAC 10 asserts the pseudo response request to request the FIFO 20 to perform the pseudo response. Various settings of the proprietary DMAC 10, such as setting of descriptor addresses, are performed by the CPU 50 via a slave interface 11 for data transmission and reception connected to the low-speed bus 72.

The memory 40 is a main memory used as a work area for the functional modules. For example, the memory 40 stores an operation program of the CPU 50 read from the HDD 60 and data processed by the CPU 50. A slave interface 41 for data transmission and reception is allocated with an address range according to the capacity of the memory 40. A module having a master interface connected to the high-speed bus 71 is capable of accessing the memory 40 by specifying the address range.

The SATA controller 30 including the standard-compliant DMAC 31 has a SATA host controller function for controlling a device conforming to the SATA standard, and executes data wiring to and data reading from the HDD 60. The setting of SATA commands and the acquisition of status information of the HDD 60 are executed by the CPU 50 via a slave interface 32 for data transmission and reception connected to the low-speed bus 72.

The standard-compliant DMAC 31 is a master DMAC for data transmission and reception having specifications specified by a standard. The standard-compliant DMAC 31 is connected to the high-speed bus 71 via a master interface 33, and is capable of accessing a module having a slave interface. Various settings of the standard-compliant DMAC 31, such as the setting of a slave module from which data is read, a slave module to which data is written, and the transfer data size, are performed by the CPU 50 via the slave interface 32.

When the standard-compliant DMAC 31 accesses the FIFO 20, the address controller 80 fixes the address to prevent increment.

The HDD 60 is a memory conforming to the SATA standard. The HDD 60 stores an operating system (OS), application programs, and so forth, and is used as a temporary save area for process data, for example.

Figure 2:
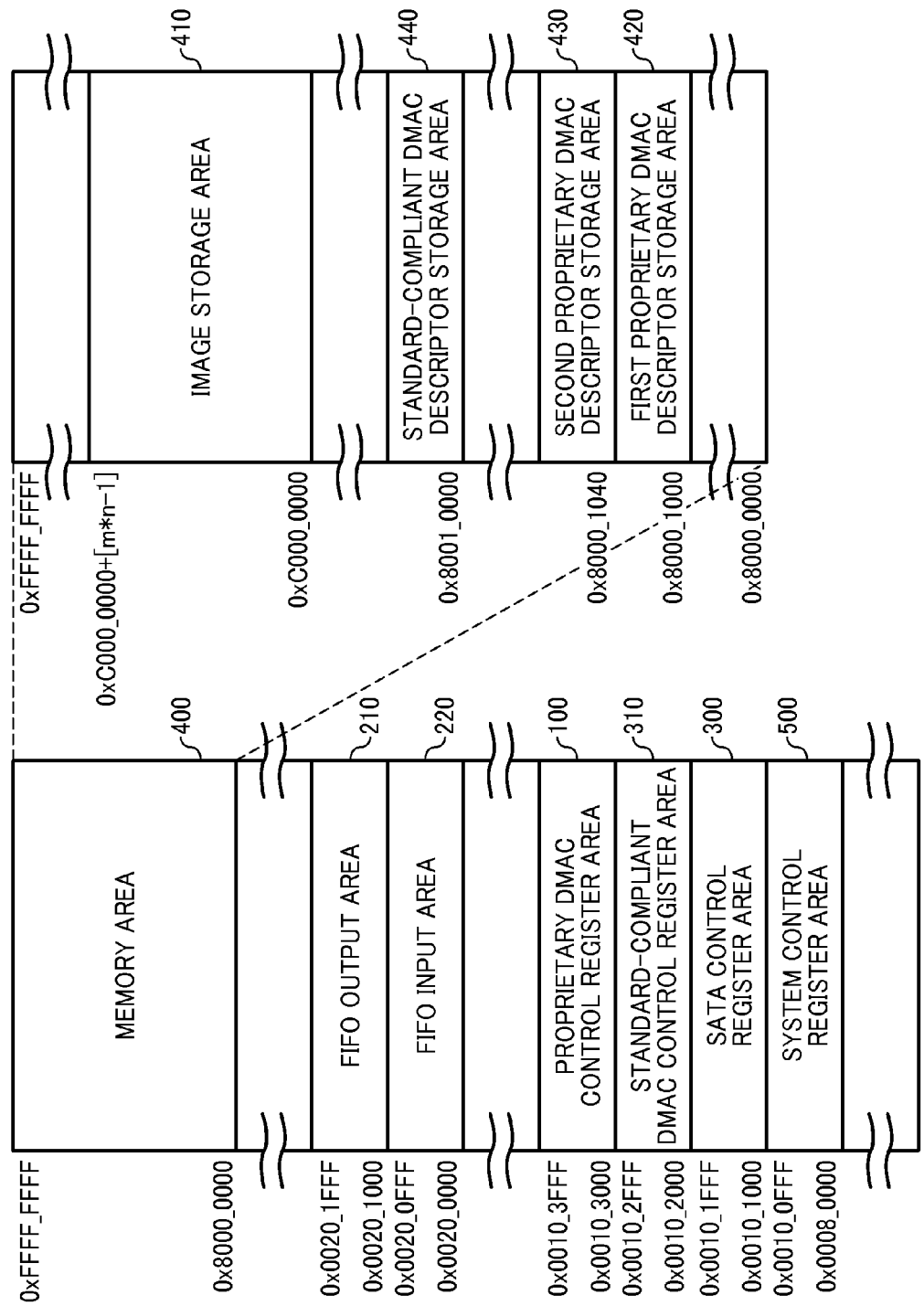
FIG. 2 is a schematic diagram illustrating a data structure in a memory of the information processing apparatus according to the embodiment.

A data structure in the memory 40 of the information processing apparatus 1 according to the embodiment will now be described with reference to FIG. 2. FIG. 2 is a schematic diagram illustrating a data structure in the memory 40 of the information processing apparatus 1 according to the embodiment.

As illustrated in FIG. 2, the memory 40 of the information processing apparatus 1 according to the embodiment includes a proprietary DMAC control register area 100, a FIFO output area 210, a FIFO input area 220, a SATA control register area 300, a standard-compliant DMAC control register area 310, a memory area 400, and a system control register area 500.

The system control register area 500 is for setting the operation mode of the CPU 50, for example, and is allocated with addresses 0x0008_0000 to 0x0010_0FFF.

The SATA control register area 300 is accessed by a master module via the slave interface 32 for data transmission and reception, and is allocated with addresses 0x0010_1000 to 0x0010_1FFF.

The standard-compliant DMAC control register area 310 is accessed by a master module via the slave interface 32 for data transmission and reception, and is allocated with addresses 0x0010_2000 to 0x0010_2FFF.

The proprietary DMAC control register area 100 is accessed by a master module via the slave interface 11 for data transmission and reception, and is allocated with addresses 0x0010_3000 to 0x0010_3FFF.

The FIFO input area 220 is accessed by a master module via the slave interface 22 for data reception, and is allocated with addresses 0x0020_0000 to 0x0020_0FFF.

The FIFO output area 210 is accessed by a master module via the slave interface 21 for data transmission, and is allocated with addresses 0x0020_1000 to 0x0020_1FFF.

The memory area 400 is accessed by a master module via the slave interface 41 for data transmission and reception, and is allocated with addresses 0x8000_0000 to 0xFFFF_FFFF.

In the present example, the memory area 400 includes an image storage area 410, a first proprietary DMAC descriptor storage area 420, a second proprietary DMAC descriptor storage area 430, and a standard-compliant DMAC descriptor storage area 440.

The image storage area 410 stores a two-dimensional image formed of n×m pixels (i.e., n columns and m rows of pixels). The CPU 50 describes operation parameters of the proprietary DMAC 10 in the first proprietary DMAC descriptor storage area 420 and the second proprietary DMAC descriptor storage area 430.

This configuration chaining the first proprietary DMAC descriptor storage area 420 and the second proprietary DMAC descriptor storage area 430 together realizes the descriptor chaining function provided not to the standard-compliant DMAC 31 but only to the proprietary DMAC 10. Although the present example has two stages of chained proprietary DMAC descriptor storage areas, a similar descriptor may be additionally created to form three or more stages of chained proprietary DMAC descriptor storage areas.

The CPU 50 describes operation parameters of the standard-compliant DMAC 31 in the standard-compliant DMAC descriptor storage area 440.

The two-dimensional DMA transfer function of the information processing apparatus 1 according to the embodiment will now be described with reference to FIGS. 3 to 5. FIG. 3 is a diagram illustrating the relationship between memory addresses and pixel information of the two-dimensional image data stored in the image storage area 410 according to the embodiment. FIG. 4 is a diagram illustrating descriptor settings in image data reading from the memory 40 through the two-dimensional DMA transfer by the proprietary DMAC 10 according to the embodiment. FIG. 5 is a diagram illustrating descriptor settings in image data writing to the memory 40 through the two-dimensional DMA transfer by the proprietary DMAC 10 according to the embodiment.

The contents in FIGS. 4 and 5 are set by the CPU 50 or the proprietary DMAC 10. That is, in the embodiment, the CPU 50 or the proprietary DMAC 10 functions as an address setting unit and a transfer parameter setting unit.

As illustrated in FIG. 3, the image storage area 410 according to the embodiment stores the two-dimensional image data formed of n×m pixels (i.e., n columns and m rows of pixels) in an address range 0xC000_0000 to 0xC000_0000+(m*n−1). When the data size per pixel is 8 bits (i.e., 1 byte), the image storage area 410 according to the embodiment is capable of storing the data of one pixel (i.e., 8 bits or 1 byte) at each address.

In FIG. 3, each cell corresponds to one pixel, and the numerical value described for each pixel represents the offset of the memory address for storing the pixel information. For example, a cell having a value "0" corresponds to the address 0xC000_0000, and a cell having a value "n−1" corresponds to an address 0xC000_0000+(n−1).

If the rectangular area to be transferred with the two-dimensional DMA transfer function of the proprietary DMAC 10 is defined with four offset addresses X1, Y1, X2, and Y2, the area enclosed by a thick solid line in FIG. 3 corresponds to the rectangular area to be transmitted.

The proprietary DMAC 10 sequentially accesses the addresses in the thus-selected rectangular area from Y1*n+X1 to Y1*n+X1+1, and so forth until Y1*n+X2. Then, the proprietary DMAC 10 shifts to (Y1+1)*n+X1, (Y1+1)*n+X1+1, and so forth until (Y1+1)*n+X2, and then to (Y1+2)*n+X1, (Y1+2)*n+X1+1, and so forth, and repeats similar operations. When the proprietary DMAC 10 completes the access to an address Y2*n+X2, the data transfer is completed.

When the proprietary DMAC 10 according to the embodiment reads image data from the memory 40 through the two-dimensional DMA transfer, the CPU 50 creates descriptors in the first proprietary DMAC descriptor storage area 420 and the second proprietary DMAC descriptor storage area 430, as illustrated in FIG. 4. In this process, a descriptor of 40 bytes is created in each of the first proprietary DMAC descriptor storage area 420 and the second proprietary DMAC descriptor storage area 430 from an address 0x8000_1000 and an address 0x8000_1040, respectively. Alternatively, the descriptor may be created at any other available memory address than the above-described address.

A transfer parameter that operates first after the start of the proprietary DMAC 10 is set in the first proprietary DMAC descriptor storage area 420, and a transfer parameter that operates after the completion of the operation set in the first proprietary DMAC descriptor storage area 420 is set in the second proprietary DMAC descriptor storage area 430. Although the present example has two stages of chained proprietary DMAC descriptor storage areas, as illustrated in FIG. 2, it is possible to form three or more stages of chained proprietary DMAC descriptor storage areas by further setting a transfer parameter that operates after the completion of the operation set in the second proprietary DMAC descriptor storage area 430. Details of the operation of data transfer are described in each of the transfer parameters.

The memory access direction is set as a transfer mode 4201. In the image data reading from the memory 40, the memory access direction is set to the memory read direction.

If there is any descriptor to be executed after the completion of the operation set in the first proprietary DMAC descriptor storage area 420, the storage address of the descriptor is set as a next descriptor address 421. In the present example, the start address 0x8000_1040 of the second proprietary DMAC descriptor storage area 430 is set as the next descriptor address 421.

In the image data reading from the memory 40, the storage start address of the two-dimensional image data including the image to be transferred (i.e., the rectangular area to be transferred) is set as a data transfer source address 422. In the present example, 0xC000_0000 is set as the data transfer source address 422.

In the image data reading from the memory 40, the address of the slave interface 22 for data reception of the FIFO 20 is set as a data transfer destination address 423. In the present example, 0x0020_0000 is set as the data transfer destination address 423.

Position information of the start position in the horizontal direction of the rectangular area to be transferred in the two-dimensional DMA transfer is specified as a horizontal image clipping start offset address 424. In the present example, X1 is specified as the horizontal image clipping start offset address 424. If the offset address X1 is specified as the horizontal image clipping start offset address 424, the (X1−1)-th pixel in the horizontal direction serves as the start pixel of the rectangular area to be transferred.

Position information of the start position in the vertical direction of the rectangular area to be transferred in the two-dimensional DMA transfer is specified as a vertical image clipping start offset address 425. In the present example, Y1 is specified as the vertical image clipping start offset address 425. If the offset address Y1 is specified as the vertical image clipping start offset address 425, the (Y1−1)- th pixel in the vertical direction serves as the start pixel of the rectangular area to be transferred.

Position information of the end position in the horizontal direction of the rectangular area to be transferred in the two-dimensional DMA transfer is specified as a horizontal image clipping end offset address 426. In the present example, X2 is specified as the horizontal image clipping end offset address 426. If the offset address X2 is specified as the horizontal image clipping end offset address 426, the (X2−1)-th pixel in the horizontal direction serves as the end pixel of the rectangular area to be transferred.

Position information of the end position in the vertical direction of the rectangular area to be transferred in the two-dimensional DMA transfer is specified as a vertical image clipping end offset address 427. In the present example, Y2 is specified as the vertical image clipping end offset address 427. If the offset address Y2 is specified as the vertical image clipping end offset address 427, the (Y2−1)-th pixel in the vertical direction serves as the end pixel of the rectangular area to be transferred.

The page size in the horizontal direction of the two-dimensional image data including the image to be transferred is set in pixels as a horizontal image size 428. In the present example, n is set as the horizontal image size 428. The page size in the vertical direction of the two-dimensional image data including the image to be transferred is set in pixels as a vertical image size 429. In the present example, m is set as the vertical image size 429.

The memory access direction is set as a transfer mode 4301. In the image data reading from the memory 40, the memory access direction is set to the memory read direction.

If there is any descriptor to be executed after the completion of the operation set in the second proprietary DMAC descriptor storage area 430, the storage address of the descriptor is set as a next descriptor address 431. In the present example, the data in the second proprietary DMAC descriptor storage area 430 is transferred last, and thus 0x0000_0000 is set as the next descriptor address 431. If the next descriptor address is 0x0000_0000, the proprietary DMAC 10 does not execute the next transfer.

In the image data reading from the memory 40, the storage start address of the two-dimensional image data including the image to be transferred is set as a data transfer source address 432. In the present example, 0xC000_0000 is set as the data transfer source address 432.

The address of the slave interface 22 for data reception of the FIFO 20 is set as a data transfer destination address 433. In the present example, 0x0020_0000 is set as the data transfer destination address 433.

Position information of the start position in the horizontal direction of the rectangular area to be transferred in the two-dimensional DMA transfer is specified as a horizontal image clipping start offset address 434. In the present example, X3 is specified as the horizontal image clipping start offset address 434. If the offset address X3 is specified as the horizontal image clipping start offset address 434, the (X3−1)-th pixel in the horizontal direction serves as the start pixel of the rectangular area to be transferred.

Position information of the start position in the vertical direction of the rectangular area to be transferred in the two-dimensional DMA transfer is specified as a vertical image clipping start offset address 435. In the present example, Y3 is specified as the vertical image clipping start offset address 435. If the offset address Y3 is specified as the vertical image clipping start offset address 435, the (Y3−1)-th pixel in the vertical direction serves as the start pixel of the rectangular area to be transferred.

Position information of the end position in the horizontal direction of the rectangular area to be transferred in the two-dimensional DMA transfer is specified as a horizontal image clipping end offset address 436. In the present example, X4 is specified as the horizontal image clipping end offset address 436. If the offset address X4 is specified as the horizontal image clipping end offset address 436, the (X4−1)-th pixel in the horizontal direction serves as the end pixel of the rectangular area to be transferred.

Position information of the end position in the vertical direction of the rectangular area to be transferred in the two-dimensional DMA transfer is specified as a vertical image clipping end offset address 437. In the present example, Y4 is specified as the vertical image clipping end offset address 437. If the offset address Y4 is specified as the vertical image clipping end offset address 437, the (Y4−1)-th pixel in the vertical direction serves as the end pixel of the rectangular area to be transferred.

The page size in the horizontal direction of the two-dimensional image data including the image to be transferred is set in pixels as a horizontal image size 438. In the present example, n is set as the horizontal image size 438. The page size in the vertical direction of the two-dimensional image data including the image to be transferred is set in pixels as a vertical image size 439. In the present example, m is set as the vertical image size 439.

As illustrated in FIG. 5, the transfer modes 4201 and 4301, the data transfer source addresses 422 and 423, and the data transfer destination addresses 423 and 433 are different between the image data reading from the memory 40 and the image data writing to the memory 40 through the two-dimensional DMA transfer by the proprietary DMAC 10 according to the embodiment.

The memory access direction is set as the transfer mode 4201. In the image data writing to the memory 40, the memory access direction is set to the memory write direction.

If there is any descriptor to be executed after the completion of the operation set in the first proprietary DMAC descriptor storage area 420, the storage address of the descriptor is set as the next descriptor address 421. In the present example, the start address 0x8000_1040 of the second proprietary DMAC descriptor storage area 430 is set as the next descriptor address 421.

In the image data writing to the memory 40, the address of the slave interface 21 for data transmission of the FIFO 20 is set as the data transfer source address 422. In the present example, 0x0020_1000 is set as the data transfer source address 422.

In the image data writing to the memory 40, the storage start address of the two-dimensional image data including the image to be transferred is set as the data transfer destination address 423. In the present example, 0xC000_0000 is set as the data transfer destination address 423.

The start position in the horizontal direction of the rectangular area to be transferred in the two-dimensional DMA transfer is specified as the horizontal image clipping start offset address 424. In the present example, X1 is specified as the horizontal image clipping start offset address 424. If the offset address X1 is specified as the horizontal image clipping start offset address 424, the (X1−1)-th pixel in the horizontal direction serves as the start pixel of the rectangular area to be transferred.

The start position in the vertical direction of the rectangular area to be transferred in the two-dimensional DMA transfer is specified as the vertical image clipping start offset address 425. In the present example, Y1 is specified as the vertical image clipping start offset address 425. If the offset address Y1 is specified as the vertical image clipping start offset address 425, the (Y1−1)-th pixel in the vertical direction serves as the start pixel of the rectangular area to be transferred.

The end position in the horizontal direction of the rectangular area to be transferred in the two-dimensional DMA transfer is specified as the horizontal image clipping end offset address 426. In the present example, X2 is specified as the horizontal image clipping end offset address 426. If the offset address X2 is specified as the horizontal image clipping end offset address 426, the (X2−1)-th pixel in the horizontal direction serves as the end pixel of the rectangular area to be transferred.

The end position in the vertical direction of the rectangular area to be transferred in the two-dimensional DMA transfer is specified as the vertical image clipping end offset address 427. In the present example, Y2 is specified as the vertical image clipping end offset address 427. If the offset address Y2 is specified as the vertical image clipping end offset address 427, the (Y2−1)-th pixel in the vertical direction serves as the end pixel of the rectangular area to be transferred.

The page size in the horizontal direction of the two-dimensional image data including the image to be transferred is set in pixels as the horizontal image size 428. In the present example, n is set as the horizontal image size 428. The page size in the vertical direction of the two-dimensional image data including the image to be transferred is set in pixels as the vertical image size 429. In the present example, m is set as the vertical image size 429.

The memory access direction is set as the transfer mode 4301. In the image data writing to the memory 40, the memory access direction is set to the memory write direction.

If there is any descriptor to be executed after the completion of the operation set in the second proprietary DMAC descriptor storage area 430, the storage address of the descriptor is set as the next descriptor address 431. In the present example, the data in the second proprietary DMAC descriptor storage area 430 is transferred last, and thus 0x0000_0000 is set as the next descriptor address 431. If the next descriptor address is 0x0000_0000, the proprietary DMAC 10 does not execute the next transfer.

In the image data writing to the memory 40, the address of the slave interface 21 for data transmission of the FIFO 20 is set as the data transfer source address 432. In the present example, 0x0020_1000 is set as the data transfer source address 432.

In the image data writing to the memory 40, the storage start address of the two-dimensional image data including the image to be transferred is set as the data transfer destination address 433. In the present example, 0xC000_0000 is set as the data transfer destination address 433.

The start position in the horizontal direction of the rectangular area to be transferred in the two-dimensional DMA transfer is specified as the horizontal image clipping start offset address 434. In the present example, X3 is specified as the horizontal image clipping start offset address 434. If the offset address X3 is specified as the horizontal image clipping start offset address 434, the (X3−1)-th pixel in the horizontal direction serves as the start pixel of the rectangular area to be transferred.

The start position in the vertical direction of the rectangular area to be transferred in the two-dimensional DMA transfer is specified as the vertical image clipping start offset address 435. In the present example, Y3 is specified as the vertical image clipping start offset address 435. If the offset address Y3 is specified as the vertical image clipping start offset address 435, the (Y3−1)-th pixel in the vertical direction serves as the start pixel of the rectangular area to be transferred.

The end position in the horizontal direction of the rectangular area to be transferred in the two-dimensional DMA transfer is specified as the horizontal image clipping end offset address 436. In the present example, X4 is specified as the horizontal image clipping end offset address 436. If the offset address X4 is specified as the horizontal image clipping end offset address 436, the (X4−1)-th pixel in the horizontal direction serves as the end pixel of the rectangular area to be transferred.

The end position in the vertical direction of the rectangular area to be transferred in the two-dimensional DMA transfer is specified as the vertical image clipping end offset address 437. In the present example, Y4 is specified as the vertical image clipping end offset address 437. If the offset address Y4 is specified as the vertical image clipping end offset address 437, the (Y4−1)-th pixel in the vertical direction serves as the end pixel of the rectangular area to be transferred.

The page size in the horizontal direction of the two-dimensional image data including the image to be transferred is set in pixels as the horizontal image size 438. In the present example, n is set as the horizontal image size 438. The page size in the vertical direction of the two-dimensional image data including the image to be transferred is set in pixels as the vertical image size 439. In the present example, m is set as the vertical image size 439.

With reference to FIG. 6, a description will now be given of a preparatory process preceding the data transfer performed by the proprietary DMAC 10 and the standard-compliant DMAC 31 via the FIFO 20 in the information processing apparatus 1 according to the embodiment. FIG. 6 is a sequence diagram illustrating a preparatory process preceding the data transfer performed by the proprietary DMAC 10 and the standard-compliant DMAC 31 via the FIFO 20 in the information processing apparatus 1 according to the embodiment.

As illustrated in FIG. 6, in the preparatory process preceding the data transfer performed by the proprietary DMAC 10 and the standard-compliant DMAC 31 via the FIFO 20 in the information processing apparatus 1 according to the embodiment, the CPU 50 first notifies the proprietary DMAC 10 of the storage address of a first descriptor for describing operation parameters (0x8000_1000 in the present example), and executes settings such as interrupt mask (step S601).

The CPU 50 then creates the first descriptor at the storage address of the first descriptor notified to the proprietary DMAC 10 (step S602). In the image data reading from the memory 40, the first descriptor created by the CPU 50 includes the contents described above with reference to FIG. 4. In the image data writing to the memory 40, the first descriptor created by the CPU 50 includes the contents described above with reference to FIG. 5.

After the creation of the first descriptor, the CPU 50 creates a second descriptor at the address 0x8000_1040 (step S603). In the image data reading from the memory 40, the second descriptor created by the CPU 50 includes the contents described above with reference to FIG. 4. In the image data writing to the memory 40, the second descriptor created by the CPU 50 includes the contents described above with reference to FIG. 5.

The CPU 50 then executes settings of the standard-compliant DMAC 31, such as settings specified by the advanced host controller interface (AHCI) standard, for example, and creates the contents of the first and second descriptors, which are referred to by the standard-compliant DMAC 31 (step S604).

The CPU 50 further executes settings of the SATA controller 30, such as settings specified by the AHCI standard, for example (step S605), and starts the proprietary DMAC 10 (step S606). The started proprietary DMAC 10 accesses the first proprietary DMAC descriptor storage area 420 (0x8000_1000 in the present example), acquires the transfer parameter, and calculates read addresses or write addresses from the acquired transfer parameter (step S607).

The CPU 50 then starts the standard-compliant DMAC 31 (step S608). The started standard-compliant DMAC 31 accesses the standard-compliant DMAC descriptor storage area 440 (0x8001_0000 in the present example), and acquires the transfer parameter (step S609). The standard-compliant DMAC 31 instructs the SATA controller 30 to issue a SATA command in accordance with the acquired transfer parameter (step S610), thereby causing the SATA controller 30 to issue the SATA command to the HDD 60 (step S611).

The information processing apparatus 1 according to the embodiment thus completes the preparation for the data transfer performed by the proprietary DMAC 10 and the standard-compliant DMAC 31 via the FIFO 20.

With reference to FIGS. 7 to 9, a description will be given of a process of reading image data from the memory 40 and writing the image data to the HDD 60 performed by the proprietary DMAC 10 and the standard-compliant DMAC 31 via the FIFO 20 in the information processing apparatus 1 according to the embodiment. FIGS. 7 to 9 are sequence diagrams illustrating a process of reading image data from the memory 40 and writing the image data to the HDD 60 performed by the proprietary DMAC 10 and the standard-compliant DMAC 31 via the FIFO 20 in the information processing apparatus 1 according to the embodiment. The process illustrated in FIGS. 7 to 9 starts immediately after the completion of the preparation for the data transfer illustrated in FIG. 6.

When the proprietary DMAC 10 and the standard-compliant DMAC 31 read image data from the memory 40 and write the image data to the HDD 60 via the FIFO 20 in the information processing apparatus 1 according to the embodiment, the SATA controller 30 having issued the SATA command first sends a data write request to the standard-compliant DMAC 31, if the SATA controller 30 is capable of receiving data, i.e., has internal buffer space available (step S701).

The standard-compliant DMAC 31 having received the data write request from the SATA controller 30 sends a data read request to the FIFO 20, if the standard-compliant DMAC 31 is capable of receiving data, i.e., has internal buffer space available (step S702). The FIFO 20 having received the data read request from the standard-compliant DMAC 31 sends a data write request to the proprietary DMAC 10, if the FIFO 20 is capable of receiving data, i.e., has internal buffer space available (step S703).

The proprietary DMAC 10 having received the data write request from the FIFO 20 sends a data read request to the memory 40, if the proprietary DMAC 10 is capable of receiving data, i.e., has internal buffer space available (step S704). The memory 40 having received the data read request from the proprietary DMAC 10 sends the corresponding data to the proprietary DMAC 10 (step S705).

The proprietary DMAC 10 having received the data from the memory 40 transfers the data to the FIFO 20 (step S706). The FIFO 20 having received the data from the proprietary DMAC 10 transfers the data to the standard-compliant DMAC 31 (step S707). The standard-compliant DMAC 31 having received the data from the FIFO 20 transfers the data to the SATA controller 30 (step S708). The SATA controller 30 having received the data from the standard-compliant DMAC 31 writes the data to the HDD 60, if the HDD 60 is capable of receiving the data (step S709).

In the present example, the data bus width is 128 bits. In the first transfer corresponding to the first descriptor, therefore, 128 bits of image data stored at addresses 0xC000_0000+Y1*n+X1 to 0xC000_0000+Y1*n+X1+15 in the memory 40 is read.

Similarly, in the second transfer, 128 bits of image data stored at addresses 0xC000_0000+Y1*n+X1+16 to 0xC000_0000+Y1*n+X1+31 in the memory 40 is read. In a transfer after the second, the read addresses are calculated from the read addresses calculated from the transfer parameter acquired by the proprietary DMAC 10 at step S607 and the last read addresses.

Then, processes similar to those of steps S701 to S709 are repeated. After all data set in the first proprietary DMAC descriptor storage area 420 (0x8000_1000 in the present example) is transferred, the proprietary DMAC 10 accesses the second proprietary DMAC descriptor storage area 430 (0x8000_1040 in the present example), acquires the transfer parameter, and calculates the read addresses from the acquired transfer parameter (step S710). The information processing apparatus 1 according to the embodiment is thus capable of using the descriptor chaining function provided not to the standard-compliant DMAC 31 but only to the proprietary DMAC 10.

The information processing apparatus 1 according to the embodiment again repeats processes similar to those of steps S701 to S709. In the present example, the data bus width is 128 bits, as described above. In the first transfer corresponding to the second descriptor, therefore, 128 bits of image data stored at addresses 0xC000_0000+Y3*n+X3 to 0xC000_0000+Y3*n+X3+15 is transferred.

Similarly, in the second transfer, 128 bits of image data stored at addresses 0xC000_0000+Y3*n+X3+16 to 0xC000_0000+Y3*n+X3+31 is transferred. In a transfer after the second, the read addresses are calculated from the read addresses calculated from the transfer parameter acquired by the proprietary DMAC 10 at step S710 and the last read addresses. The information processing apparatus 1 according to the embodiment is thus capable of using the two-dimensional DMA transfer function provided not to the standard-compliant DMAC 31 but only to the proprietary DMAC 10.

In the example illustrated in FIG. 7, the proprietary DMAC 10 issues the data read request after the standard-compliant DMAC 31 issues the data read request. Alternatively, the proprietary DMAC 10 may issue the data read request before the standard-compliant DMAC 31 issues the data read request. Further, the proprietary DMAC 10 and the standard-compliant DMAC 31 may issue a further data read request before receiving the data transmitted in response to a previously issued data read request.

As illustrated in FIG. 8, after having transferred all data set in the second proprietary DMAC descriptor storage area 430 (0x8000_1040 in the present example) to the FIFO 20

(step S801), the proprietary DMAC 10 notifies the CPU 50 of the completion of the data transfer (step S802), and sends a pseudo response request to the FIFO 20 (step S803).

Then, the SATA controller 30 sends a data write request to the standard-compliant DMAC 31 (step S804), and the standard-compliant DMAC 31 sends a data read request to the FIFO 20 (step S805). In response to the data read request, the FIFO 20 having received the pseudo response request from the proprietary DMAC 10 transfers pseudo data to the standard-compliant DMAC 31 (step S806).

The standard-compliant DMAC 31 having received the pseudo data from the FIFO 20 transfers the pseudo data to the SATA controller 30 (step S807). The SATA controller 30 having received the pseudo data from the standard-compliant DMAC 31 writes the pseudo data to the HDD 60 (step S808).

A description will now be given of the reason for the above-described configuration in which the proprietary DMAC 10 having transferred all data to the FIFO 20 sends the pseudo response request to the FIFO 20 and the FIFO 20 transfers the pseudo data.

As described above with reference to FIG. 3, the data transfer size of the data transferred by the proprietary DMAC 10 with the two-dimensional DMA transfer function corresponds to the specific rectangular area set in bytes. However, the data transfer size of the data transferred by the standard-compliant DMAC 31 is set in sectors (in units of 512 bytes in the present example). That is, the minimum data transfer size of the proprietary DMAC 10 is 1 byte, while the minimum data transfer size of the standard-compliant DMAC 31 is 512 bytes.

Therefore, data smaller than the data transfer size of the standard-compliant DMAC 31 is eventually left in the FIFO 20. Further, if the thus-left data is transferred by the standard-compliant DMAC 31, the FIFO 20 is emptied.

For example, when 600 bytes of data is transferred from the memory 40 to the HDD 60, if 512 bytes of data is first transferred, the remaining 88 (i.e., 600–512) bytes of data is left in the FIFO 20. If the 88 bytes of data is also transferred by the standard-compliant DMAC 31, the FIFO 20 is emptied. In this case, the standard-compliant DMAC 31 needs 424 (i.e., 512–88) bytes of extra data to perform the data transfer.

If the FIFO 20 is emptied, the FIFO 20 is unable to transfer data to the standard-compliant DMAC 31 even if a data read request is received therefrom. Consequently, the standard-compliant DMAC 31 continues to wait for data transfer from the FIFO 20, and the process fails to complete.

In the information processing apparatus 1 according to the embodiment, therefore, the FIFO 20 continues to transfer pseudo data to the standard-compliant DMAC 31 in response to the pseudo response request from the proprietary DMAC 10, even if the internal buffer thereof is emptied, until data is accumulated to the data transfer size of the standard-compliant DMAC 31. Accordingly, the standard-compliant DMAC 31 is capable of continuing to transfer data without delay.

With this configuration, the information processing apparatus 1 according to the embodiment is capable of easily using the functions provided not to the standard-compliant DMAC 31 but to the proprietary DMAC 10, such as the two-dimensional DMA transfer function and the descriptor chaining function.

The information processing apparatus 1 according to the embodiment then repeats processes similar to those of steps S804 to S808. Thereby, the SATA controller 30 sends the last data write request to the standard-compliant DMAC 31 (step S901), as illustrated in FIG. 9. The standard-compliant DMAC 31 having received the last data write request from the SATA controller 30 sends the last data read request to the FIFO 20 (step S902).

The FIFO 20 having received the last data read request from the standard-compliant DMAC 31 transfers the last pseudo data to the standard-compliant DMAC 31 (step S903). The standard-compliant DMAC 31 having received the last pseudo data from the FIFO 20 transfers the last pseudo data to the SATA controller 30 (step S904). The SATA controller 30 having received the last pseudo data from the standard-compliant DMAC 31 writes the last pseudo data to the HDD 60 (step S905).

The standard-compliant DMAC 31 having transferred the last pseudo data to the SATA controller 30 further notifies the CPU 50 of the completion of the data transfer (step S906). Notified of the completion of the data transfer by the standard-compliant DMAC 31, the CPU 50 instructs the proprietary DMAC 10 to cancel the pseudo response (step S907). In response to the instruction to cancel the pseudo response, the proprietary DMAC 10 sends a pseudo response cancellation request to the FIFO 20 (step S908).

In the information processing apparatus 1 according to the embodiment, the proprietary DMAC 10 and the standard-compliant DMAC 31 thus read image data from the memory 40 and write the image data to the HDD 60 via the FIFO 20.

Figure 10:
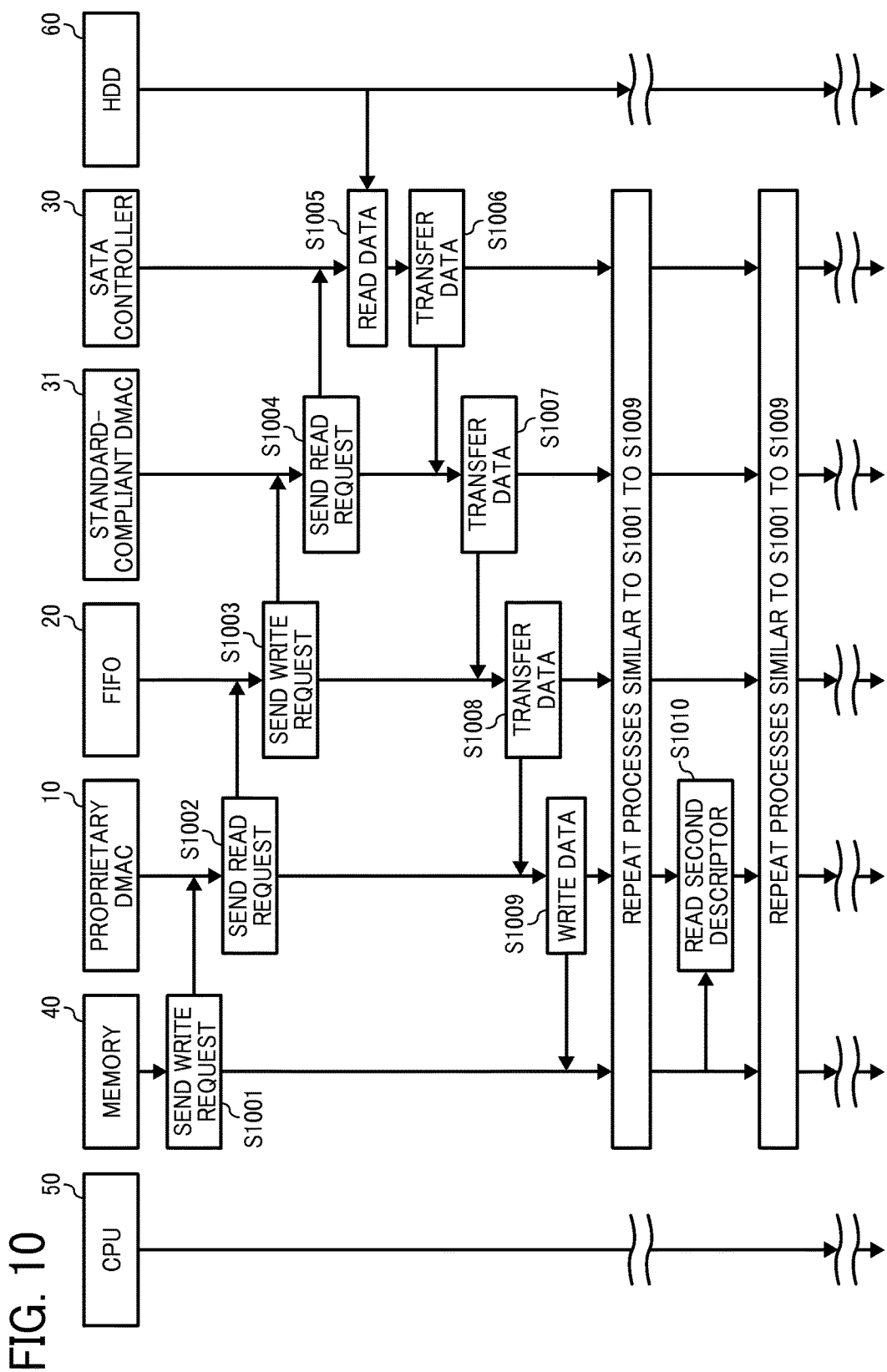
Figure 11:
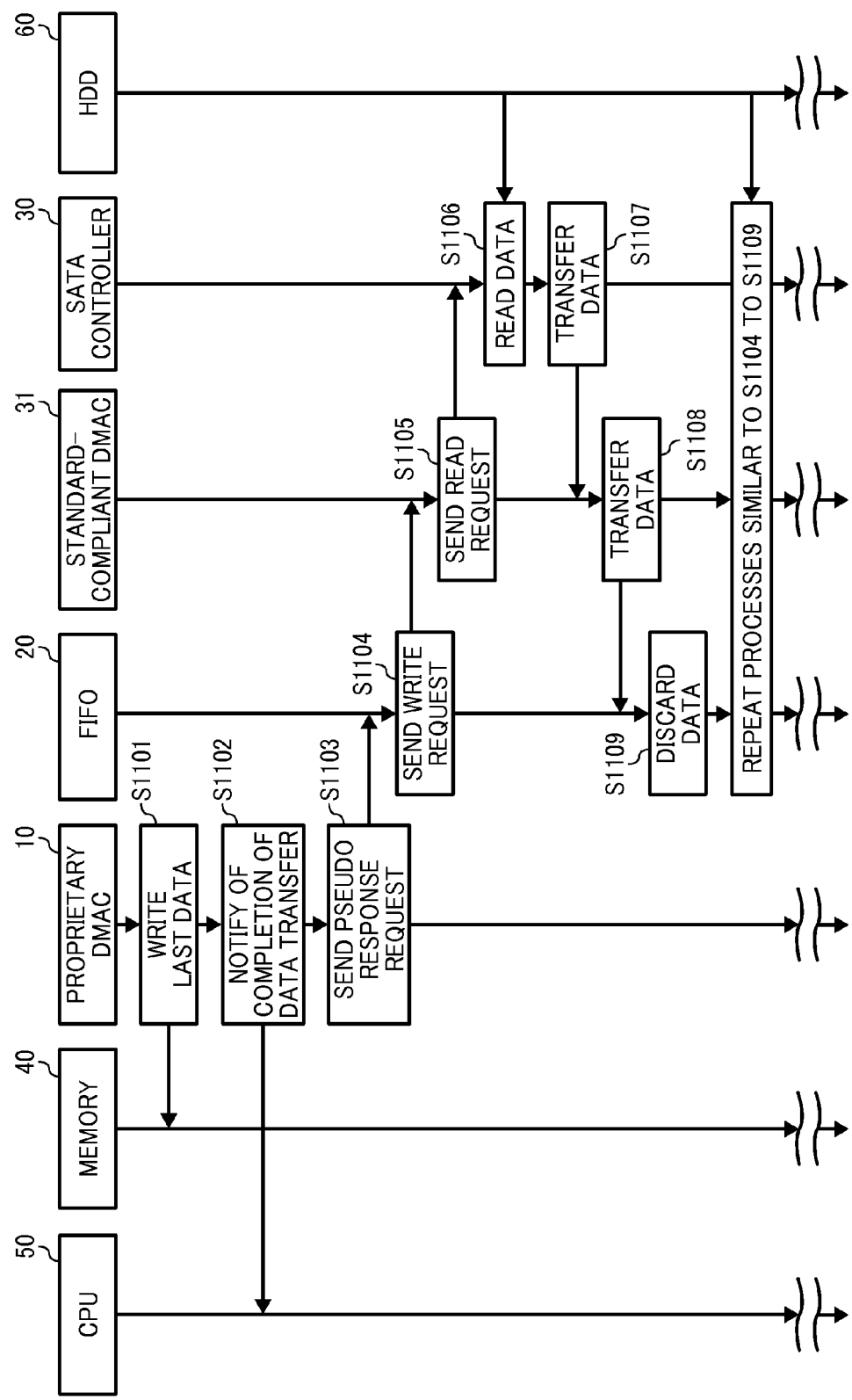

With reference to FIGS. 10 to 12, a description will now be given of a process of reading image data from the HDD 60 and writing the image data to the memory 40 performed by the proprietary DMAC 10 and the standard-compliant DMAC 31 via the FIFO 20 in the information processing apparatus 1 according to the embodiment. FIGS. 10 to 12 are sequence diagrams illustrating a process of reading image data from the HDD 60 and writing the image data to the memory 40 performed by the proprietary DMAC 10 and the standard-compliant DMAC 31 via the FIFO 20 in the information processing apparatus 1 according to the embodiment. The process illustrated in FIGS. 10 to 12 starts immediately after the completion of the preparation for the data transfer illustrated in FIG. 6.

When the proprietary DMAC 10 and the standard-compliant DMAC 31 read image data from the HDD 60 and write the image data to the memory 40 via the FIFO 20 in the information processing apparatus 1 according to the embodiment, the memory 40 first sends a data write request to the proprietary DMAC 10, if the memory 40 is capable of receiving data, i.e., has internal buffer space available (step S1001).

The proprietary DMAC 10 having received the data write request from the memory 40 sends a data read request to the FIFO 20, if the proprietary DMAC 10 is capable of receiving data, i.e., has internal buffer space available (step S1002). The FIFO 20 having received the data read request from the proprietary DMAC 10 sends a data write request to the standard-compliant DMAC 31, if the FIFO 20 is capable of receiving data, i.e., has internal buffer space available (step S1003).

The standard-compliant DMAC 31 having received the data write request from the FIFO 20 sends a data read request to the SATA controller 30, if the standard-compliant DMAC 31 is capable of receiving data, i.e., has internal buffer space available (step S1004). The SATA controller 30 having received the data read request from the standard-compliant DMAC 31 reads the corresponding data from the HDD 60, if the SATA controller 30 is capable of receiving data, i.e., has internal buffer space available (step S1005), and transfers the data to the standard-compliant DMAC 31 (step S1006).

The standard-compliant DMAC 31 having received the data from the SATA controller 30 transfers the data to the FIFO 20 (step S1007). The FIFO 20 having received the data from the standard-compliant DMAC 31 transfers the data to the proprietary DMAC 10 (step S1008). The proprietary DMAC 10 having received the data from the FIFO 20 writes the data to the memory 40 (step S1009).

The data bus width is 128 bits in the present example. In the first transfer corresponding to the first descriptor, therefore, 128 bits of image data is written at the addresses 0xC000_0000+Y1*n+X1 to 0xC000_0000+Y1*n+X1+15 in the memory 40. Similarly, in the second transfer, 128 bits of image data is written at the addresses 0xC000_0000+Y1*n+X1+16 to 0xC000_0000+Y1*n+X1+31 in the memory 40. In a transfer after the second, the write addresses are calculated from the write addresses calculated from the transfer parameter acquired by the proprietary DMAC 10 at step S607 and the last write addresses.

Then, processes similar to those of steps S1001 to 1009 are repeated. After all data set in the first proprietary DMAC descriptor storage area 420 (0x8000_1000 in the present example) is transferred, the proprietary DMAC 10 accesses the second proprietary DMAC descriptor storage area 430 (0x8000_1040 in the present example), acquires the transfer parameter, and calculates the write addresses from the acquired transfer parameter (step S1010). The information processing apparatus 1 according to the embodiment is thus capable of using the descriptor chaining function provided not to the standard-compliant DMAC 31 but only to the proprietary DMAC 10.

The information processing apparatus 1 according to the embodiment again repeats processes similar to those of steps S1001 to 1009. The data bus width is 128 bits in the present example, as described above. In the first transfer corresponding to the second descriptor, therefore, 128 bits of image data is written at the addresses 0xC000_0000+Y3*n+X3 to 0xC000_0000+Y3*n+X3+15 in the memory 40.

Similarly, in the second transfer, 128 bits of image data is written at the addresses 0xC000_0000+Y3*n+X3+16 to 0xC000_0000+Y3*n+X3+31. In a transfer after the second, the write addresses are calculated from the write addresses calculated from the transfer parameter acquired by the proprietary DMAC 10 at step S710 and the last write addresses. The information processing apparatus 1 according to the embodiment is thus capable of using the two-dimensional DMA transfer function provided not to the standard-compliant DMAC 31 but only to the proprietary DMAC 10.

In the example illustrated in FIG. 10, the standard-compliant DMAC 31 issues the data read request after the proprietary DMAC 10 issues the data read request. Alternatively, the standard-compliant DMAC 31 may issue the data read request before the proprietary DMAC 10 issues the data read request. Further, the proprietary DMAC 10 and the standard-compliant DMAC 31 may issue a further data read request before receiving the data transmitted in response to a previously issued data read request.

As illustrated in FIG. 11, after having written all data set in the second proprietary DMAC descriptor storage area 430 (0x8000_1040 in the present example) to the memory 40 (step S1101), the proprietary DMAC 10 notifies the CPU 50 of the completion of the data transfer (step S1102), and sends a pseudo response request to the FIFO 20 (step S1103).

Then, data is transferred to the FIFO 20 in response to a data write request sent to the standard-compliant DMAC 31 by the FIFO 20 (steps S1104 to S1108). The FIFO 20 having received the pseudo response request from the proprietary DMAC 10 discards the transferred data (step S1109).

A description will now be given of the reason for the above-described configuration in which the proprietary DMAC 10 having written all data to the memory 40 sends the pseudo response request to the FIFO 20 and the FIFO 20 discards any further received data.

As described above, the minimum data transfer size of the proprietary DMAC 10 is different from, more specifically, smaller than, the minimum data transfer size of the standard-compliant DMAC 31.

If all data to be transferred is written to the memory 40 by the proprietary DMAC 10, the proprietary DMAC 10 no longer needs to read data from the FIFO 20. If data continues to be written to the FIFO 20 by the standard-compliant DMAC 31, however, the FIFO 20 will be filled.

For example, when 600 bytes of data is transferred from the HDD 60 to the memory 40, if all of the 600 bytes of data is written to the memory 40, no further data is read from the FIFO 20. However, 424 (i.e., 512−(600−512)) bytes of data continues to be written to the FIFO 20 by the standard-compliant DMAC 31, eventually filling the FIFO 20.

If the FIFO 20 is filled, the FIFO 20 is unable to send the data write request to the standard-compliant DMAC 31. Consequently, the standard-compliant DMAC 31 continues to wait for a data write request from the FIFO 20, and the process fails to complete.

In the information processing apparatus 1 according to the embodiment, therefore, the FIFO 20 continues to send the data write request to the standard-compliant DMAC 31 in response to the pseudo response request from the proprietary DMAC 10, even if the internal buffer of the FIFO 20 is filled, until data is accumulated to the data transfer size of the standard-compliant DMAC 31, and discards any further data received thereafter. Accordingly, the standard-compliant DMAC 31 is capable of continuing to transfer data without delay.

With this configuration, the information processing apparatus 1 according to the embodiment is capable of easily using the functions provided not to the standard-compliant DMAC 31 but to the proprietary DMAC 10, such as the two-dimensional DMA transfer function and the descriptor chaining function.

The information processing apparatus 1 according to the embodiment then repeats processes similar to those of steps S1104 to S1109. Thereby, the FIFO 20 sends the last data write request to the standard-compliant DMAC 31 (step S1201), as illustrated in FIG. 12. The standard-compliant DMAC 31 having received the last data write request from the FIFO 20 sends the last data read request to the SATA controller 30 (step S1202).

The SATA controller 30 having received the last data read request from the standard-compliant DMAC 31 reads the last data from the HDD 60 (step S1203), and transfers the last data to the standard-compliant DMAC 31 (step S1204). The standard-compliant DMAC 31 having received the last data from the SATA controller 30 transfers the last data to the FIFO 20 (step S1205). The FIFO 20 having received the last data from the standard-compliant DMAC 31 discards the last data (step S1206).

The standard-compliant DMAC 31 having transferred the last data to the FIFO 20 further notifies the CPU 50 of the completion of the data transfer (step S1207). Notified of the completion of the data transfer by the standard-compliant DMAC 31, the CPU 50 instructs the proprietary DMAC 10 to cancel the pseudo response (step S1208). In response to the instruction to cancel the pseudo response, the proprietary DMAC 10 sends a pseudo response cancellation request to the FIFO 20 (step S1209).

In the information processing apparatus 1 according to the embodiment, the proprietary DMAC 10 and the standard-compliant DMAC 31 thus read image data from the HDD 60 and write the image data to the memory 40 via the FIFO 20.

Although the data transfer between the memory 40 and the HDD 60 has been described in the embodiment, the present disclosure is similarly applicable to the data transfer between different input-output devices connected to the information processing apparatus 1.

An embodiment of this disclosure realizes efficient control in the combined use of a DMAC configured for a predetermined module and a DMAC configured to provide a predetermined function.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A data transfer control apparatus that controls data transfers between different modules, the data transfer control apparatus comprising:
    a module direct memory access controller configured for a predetermined module;
    a function direct memory access controller to provide a function absent in the module direct memory access controller, the function including one or more of a two-dimensional direct memory access function and a descriptor chaining function; and
    a temporary memory coupled to the module direct memory access controller and the function direct memory access controller, the temporary memory configured to,
        output data to the function direct memory access controller in order of input, when the temporary memory receives input of the data from the module direct memory access controller in an order of acquisition of the data by the module direct memory access controller from the predetermined module, and
        output the data to the module direct memory access controller in order of input, when the temporary memory receives input of the data from the function direct memory access controller, the data destined to be transferred to the predetermined module.

2. The data transfer control apparatus of claim 1, wherein a minimum data transfer size of the function direct memory access controller is smaller than a minimum data transfer size of the module direct memory access controller, and
    wherein when the temporary memory is input with data to be transferred to the predetermined module and the temporary memory is emptied, the temporary memory outputs pseudo data to the module direct memory access controller.

3. The data transfer control apparatus of claim 2, wherein the temporary memory outputs the pseudo data to the module direct memory access controller according to a control signal output from the function direct memory access controller.

4. The data transfer control apparatus of claim 1, wherein a minimum data transfer size of the function direct memory access controller is smaller than a minimum data transfer size of the module direct memory access controller, and
    wherein when the temporary memory is input with data acquired from the predetermined module and when the temporary memory is filled, the temporary memory discards any further data input to the temporary memory by the module direct memory access controller.

5. The data transfer control apparatus of claim 4, wherein the temporary memory discards the any further data input to the temporary memory by the module direct memory access controller according to a control signal output from the function direct memory access controller.

6. The data transfer control apparatus of claim 1, further comprising:
    a main memory to serve as at least one of an output destination and an input source of data; and an address setting unit to set at least one of a write destination address for writing data to the main memory and a read source address for reading data from the main memory.

7. The data transfer control apparatus of claim 6, wherein the address setting unit is one of the function direct memory access controller and a processor.

8. The data transfer control apparatus of claim 1, which consecutively controls the data transfers and further comprises:
a transfer parameter setting unit to set, for each of the data transfers, a transfer parameter containing details of the data transfer, which include a setting destination address of a transfer parameter containing details of a data transfer to be controlled next.

9. The data transfer control apparatus of claim 8, wherein the transfer parameter setting unit is one of the function direct memory access controller and a processor.

10. The data transfer control apparatus of claim 1, wherein the temporary memory has a storage capacity twice a burst transfer size of the module direct memory access controller.

11. A data transfer control apparatus that controls data transfers between different modules, the data transfer control apparatus comprising:
a module direct memory access controller configured for a predetermined module;
a function direct memory access controller to provide a function absent in the module direct memory access controller;
a temporary memory coupled to the module direct memory access controller and the function direct memory access controller, the temporary memory configured to,
output data to the function direct memory access controller in order of input, when the temporary memory receives input of the data from the module direct memory access controller in an order of acquisition of the data by the module direct memory access controller from the predetermined module, and
output the data to the module direct memory access controller in order of input, when the temporary memory receives input of the data from the function direct memory access controller, the data destined to be transferred to the predetermined module; and
an address setting device configured to set at least one of a write destination address for writing the data to the main memory and a read source address for reading data from a main memory by calculating, when image data of a specific rectangular area in two-dimensional image data is transferred between the main memory and another device, at least one of,
(i) the write destination address for writing the image data to the main memory serving as the output destination of the image data and the read source address for reading the image data from the main memory serving as the input source of the image data based on a number of pixels in a horizontal direction of the two-dimensional image data,
(ii) a number of pixels in a vertical direction of the two-dimensional image data,
(iii) horizontal position information in the two-dimensional image data of a pixel in the image data of the rectangular area to be transferred first, vertical position information in the two-dimensional image data of the pixel in the image data of the rectangular area to be transferred first,
(iv) horizontal position information in the two-dimensional image data of a pixel in the image data of the rectangular area to be transferred last, and
(v) vertical position information in the two-dimensional image data of the pixel in the image data of the rectangular area to be transferred last.

12. A data transfer control apparatus comprising:
a standard compliant direct memory access controller (DMAC) configured for a predetermined module;
a proprietary DMAC configured to perform one or more of a two-dimensional direct memory access function and a descriptor chaining function; and
a temporary memory coupled to the standard compliant DMAC and the proprietary DMAC, the temporary memory configured to,
continuously output pseudo data to the standard compliant DMAC until an amount of data accumulated equals a data transfer size of the standard compliant DMAC, when the temporary memory is input with output data to be transferred to the predetermined module and the temporary memory is emptied, and
discard input data input to the temporary memory by the proprietary DMAC, when the temporary memory is input with the input data acquired from the predetermined module and the temporary memory is filled.

* * * * *